United States Patent Office 3,523,178
Patented Aug. 4, 1970

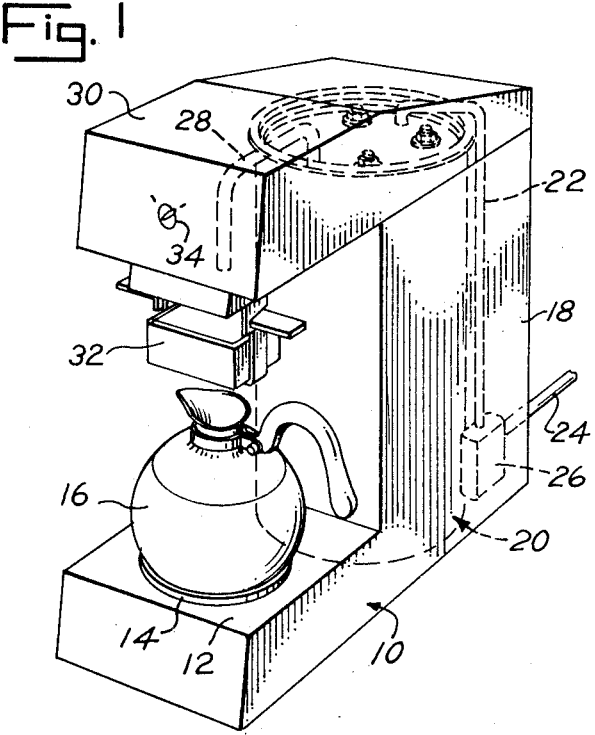
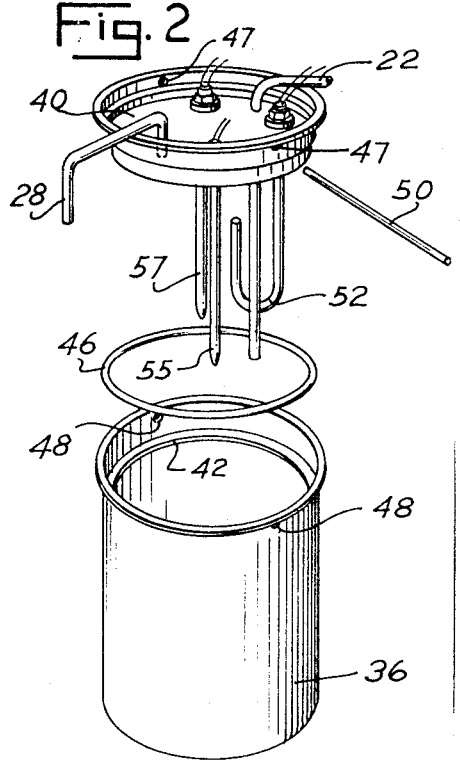
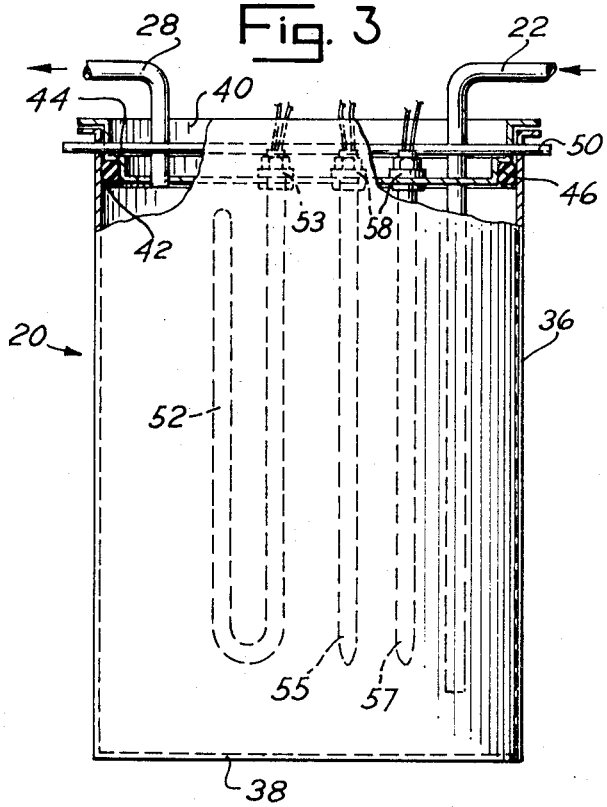
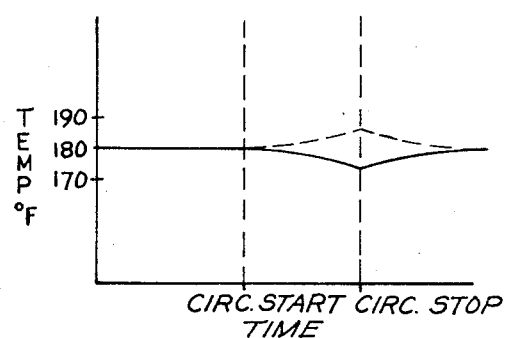
INVENTORS
WILLIAM J. SPENSLEY
& THEODORE DRWAL
BY Bair, Freeman &
Molinare ATTORNEYS

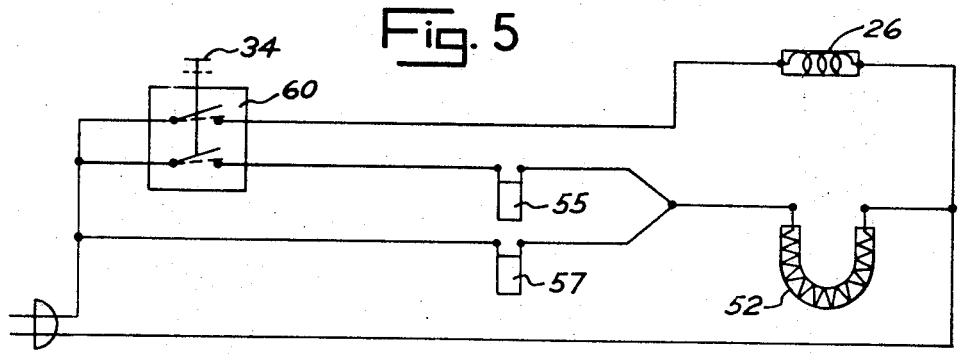
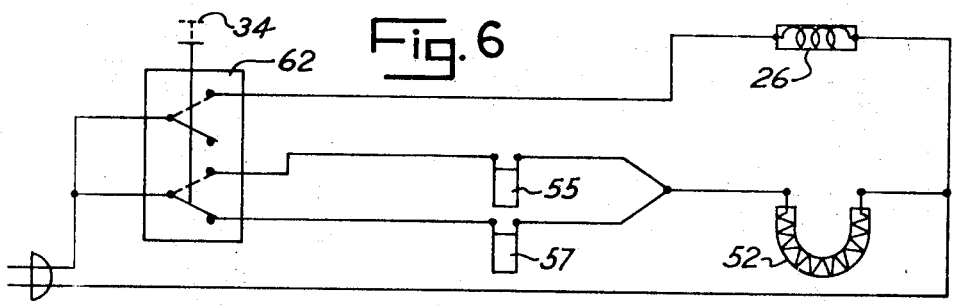
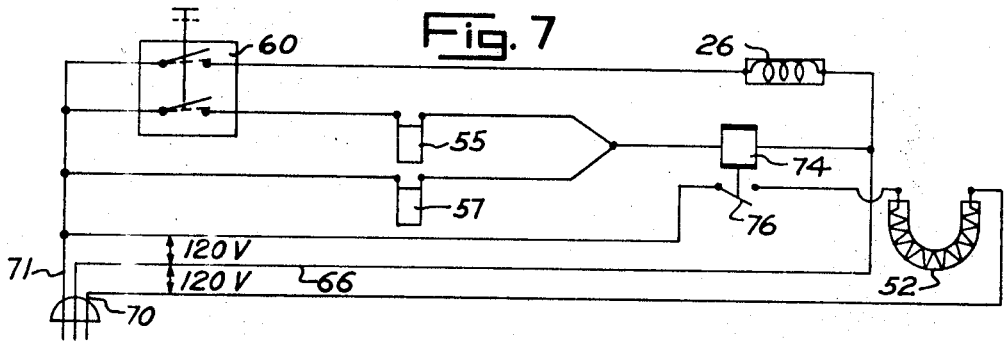
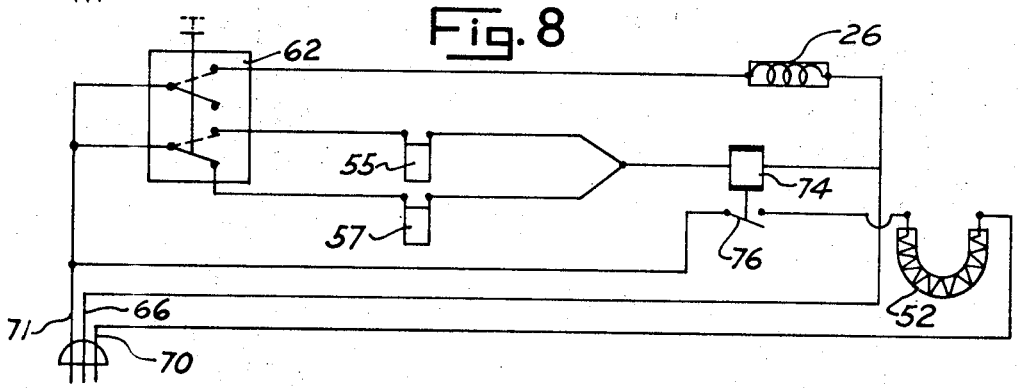

3,523,178
METHOD AND APPARATUS FOR HEATING LIQUIDS
William J. Spensley and Theodore Drwal, Chicago, Ill., assignors to Hill-Shaw Company, Chicago, Ill., a corporation of Illinois
Filed May 10, 1968, Ser. No. 728,118
Int. Cl. F24h 1/00
U.S. Cl. 219—330                               3 Claims

ABSTRACT OF THE DISCLOSURE

This invention concerns a method and apparatus for heating liquids in a closed tank or reservoir in which a liquid is maintained at an elevated threshold temperature by an immersion heater and a novel control arrangement. When the inlet valve is opened, cold liquid flows from the service line into the lower portion of the reservoir to displace the heated liquid therewithin and cause it to flow out through the outlet duct. The heater within the reservoir is controlled by a pair of thermostats at different times to avoid any overflow or drip of liquid from the outlet duct which could result from the expansion of the liquid after the valve is shut. One of the thermostats controls the heater to maintain the liquid at its elevated threshold temperature when the valve is shut, and the second thermostat assumes control of the heater when the valve is opened and liquid flows into the reservoir to maintain the liquid at a temperature in excess of the elevated threshold temperature.

BACKGROUND OF THE INVENTION

This invention relates to a method and apparatus for heating liquid and, more particularly, to a new and improved method and apparatus for preventing overflow drip from a heated liquid reservoir.

It is common to maintain a reservoir of heated liquid in readiness to be dispensed in specific amounts for specific purposes. Such prior reservoirs generally comprise sealed tanks or vessels in which the liquid in the reservoir, such as water, is maintained in readiness at an elevated temperature by an electric immersion heater. The hot liquid is dispensed by circulating fresh liquid from an appropriate service line through an input duct into the bottom of the reservoir. The hot liquid in the reservoir is thus displaced out through an output duct. In the prior arrangements undesirable dripping from the output duct is encountered due to the fact that, as the cool liquid enters the reservoir from the input duct, the overall temperature of the liquid in the reservoir is decreased. When dispensing has been completed and the flow of water from the input duct has ceased, the immersion heater continues to heat the cooled liquid causing the liquid to expand and overflow through the output duct resulting in an undesirable drip from that duct.

Various methods and arrangements have been employed to avoid this undesirable drip. One such method utilizes a syphoning arrangement wherein a portion of the liquid in the reservoir is syphoned out of the reservoir after the flow of liquid through the input duct ceases, providing a space at the top of the reservoir to allow for the subsequent expansion. Another arrangement that has been employed is the provision of a manual faucet having a displacement mechanism attached to it. When the faucet is opened, the displacement mechanism enters the tank and displaces a few ounces of liquid from the container. The faucet is then closed and the mechanism is moved out of the tank leaving a space formerly occupied by the displacement mechanism in which the liquid can subsequently expand. Another rather elaborate measure which has been employed is the provision of a small chamber within the reservoir which has a second heater therein. The chamber is apertured and the second heater is energized creating a steam or vapor condition within the chamber, the steam driving the liquid through the aperture from the chamber and providing an expansion space in the chamber. Finally another method which has been employed is the utilization of a reservoir which is never quite completely full to allow for expansion. The liquid is drawn from the reservoir via a movable discharge tube which is lowered into the reservoir and the flow of liquid is stopped by raising the tube. In general, all of these prior arrangements necessitate the provision of a mechanical space in the reservoir in which the liquid can expand after dispensing has ceased. Thus, the reservoir must necessarily be somewhat larger than the volume of liquid necessary for use and relatively elaborate mechanical arrangements must be provided.

The method and apparatus of our invention avoid undesirable dripping of liquid from the reservoir and eliminate the need for an expansion space in the container. The reservoir of our invention remains substantially full of liquid at all times and elaborate mechanical apparatus is eliminated. Moreover, the arrangement of our invention is simple in operation and reliable and overflow drip is avoided by electrical control.

SUMMARY OF THE INVENTION

In a principal aspect, a method and apparatus incorporating the principles of our invention includes a liquid holding vessel or reservoir having heating means for maintaining the liquid in the vessel at a threshold temperature, the heating means being controlled by a thermostat which is responsive to the temperature of the liquid in the vessel. When it is desired to dispense the liquid from the vessel, liquid is flowed through an input duct having a valve therein for controlling the flow through the duct. When the valve is open, control of the heating means is transferred from the thermostat, energizing the heating means to raise the temperature of the liquid to a second temperature which is in excess of the threshold temperature. When dispensing of the liquid from the vessel is ceased by closing the valve, control of the heating means is returned to the thermostat to allow the temperture of the liquid to return to the threshold temperature.

These and other objects, features and advantages of the present invention will be more clearly understood through a consideration of the following detailed description.

BRIEF DESCRIPTION OF THE DRAWINGS

In the course of this description, reference will frequently be made to the attached drawings in which:

FIG. 1 is an overall view of the preferred embodiment of liquid heater of our invention shown, as an example, being used in a coffee maker;

FIG. 2 is an exploded view of the preferred embodiment of liquid heater of our invention;

FIG. 3 is an elevation view of the liquid heater of our invention having a part of the vessel broken away;

FIG. 4 is a graph plot by way of example of temperature v. time showing the heating characteristics of prior liquid heaters and of the liquid heater of our invention;

FIG. 5 is one embodiment of electrical circuit of our invention;

FIG. 6 is a second embodiment of electrical circuit of our invention;

FIG. 7 is an embodiment of electrical circuit similar to the circuit FIG. 5 but constructed to provide increased voltage to the heater; and FIG. 8 is an embodiment of electrical circuit similar to the circuit of FIG. 6 but constructed to provide increased voltage to the heater.

DESCRIPTION OF THE PREFERRED EMBODIMENT

Referring to FIG. 1, the liquid heater of our invention is shown by way of illustration only, as incorporated in a coffee maker although those skilled in the art will appreciate that the invention has use in a number of other liquid heating and dispensing devices. The apparatus of FIG. 1 includes a base 10 having a platform 12 which is provided with an electric heating coil 14 for heating and supporting a standard coffee pot 16. A housing 18 extends upwardly from the base 10 and encloses a water reservoir or vessel 20 containing water at an elevated temperature to be used in brewing the coffee. The vessel 20 is sealed and one end of an input duct 22 communicates with the vessel; the other end of the duct being connected to a water service line 24 via a solenoid operated valve 26. An output duct 28 also communicates with the vessel 20 and the discharge end of the output duct 28 extends through an overhanging housing 30 and discharges into a coffee ground holding arrangement 32 aligned with the open mouth of the coffee pot 16. A suitable switch control knob 34 is provided to control the brewing operation, the switch arrangement being more fully described later.

Referring particularly to FIGS. 2 and 3, the vessel 20 comprises a generally cylindrical container 36 having a sealed bottom 38 and having a cover 40 adapted to sealingly close the top end of the container. The inner wall of the container 36 carries an annular shoulder 42 and the cover 40 is annularly stepped at 44 to accommodate an O-ring seal 46, the seal cooperating with the annular shoulder 42 to seal the container. The cover 40 and the walls of the container 36 each carry a pair of apertures 47 and 48, respectively, which, when aligned with each other, accommodate a rod 50 journaled therethrough for securing the cover 40 to the container 36. The input duct 22 extends through the cover 40 to adjacent the bottom of the vessel and the output duct 28 extends through the cover 40 from the top of the vessel. An electrical immersion heater 52 extends into the vessel and is secured to the cover 40, as by nut 53. A higher temperature operating thermostat 55 and a lower temperature standby thermostat 57 are also secured to the cover 40 by nuts 58, the thermostats 55 and 57 also extending into the vessel.

In operation, the vessel 20 is maintained substantially filled with water at all times and the water is maintained at an elevated standby threshold temperature by the electrical immersion heater 52. The immersion heater 52 is controlled by the standby thermostat 57 to maintain the water at the standby threshold temperature so that it is instantaneously ready to be dispensed at all times. Referring to FIG. 4, a desirable standby threshold temperature may be 180° F. when the water is to be utilized in a coffee brewer. When it is desired to brew a fresh pot of coffee, the liquid in the vessel is dispensed by opening the solenoid operated valve 26 in the input duct 22 causing water to flow from the service line 24 through the input duct 22 to the bottom of the vessel 20, displacing the heated water from the vessel through the output duct 28. The solid line plot, as shown in FIG. 4, indicates the change in temperature characteristics of the liquid in the prior heating arrangements. As circulation starts through the input duct 22, the overall temperature of the water in the vessel tends to decrease in the prior water vessels, due to the addition of the cooler water from the service line 24. Thus, when dispensing of the liquid is completed and the valve 26 is shut, the overall temperature of the water present in the vessel is lower than the desired threshold temperature of 180° F. As the heater of the prior arrangements continues to reheat the water in the vessel back to the desired higher threshold temperature, the water which completely filled the vessel expands causing an undesirable overflow drip through the output duct 28.

However, by provision of the operating thermostat 55 in the arrangement of our invention, this undesirable drip is eliminated. The immersion heater 52 is selected to be of a capacity such that it is able to maintain the water in the vessel at a temperature in excess of the 180° F. threshold temperature while the water is being circulated through the vessel 20 and dispensed through the output duct 28. Thus, when the valve 26 is opened to commence circulation of water through the vessel 20, control of the heater 52 is shifted from the standby thermostat 57 to the operating thermostat 55 which is set to operate at a higher temperature than the standby thermostat 57, for example 190° F. As shown in the dotted line plot of FIG. 4, the water in the vessel during circulation will now increase in temperature rather than decrease as in the prior arrangements, since the heater is energized when the valve 26 is opened. Since the heater 52 is of such a capacity to raise the water temperature while the water is circulating through the vessel 20, the temperature will rise above the threshold temperature of 180° F. but will not exceed a predetermined maximum set by the operating thermostat 55, e.g., 190° F. Thus, when the valve 26 is shut upon completion of dispensing of water from the vessel 20, the water in the vessel will be at a temperature in excess of the threshold temperature of 180° F. Also when the valve 26 is shut and the circulation through the vessel 20 ceases, control of the heater 52 is shifted from the operating thermostat 55 back to the standby thermostat 57. Since the water temperature is in excess of the standby thermostat setting, the heater will be de-energized causing the water to cool back toward the 180° F. threshold temperatute. As the water cools, it will contract slightly in volume rather than expand as in the prior heating arrangements, thus avoiding drip from the output duct 28. Although the graph of FIG. 4 indicates temperatures of 170° to 190° F., it will be readily understood that those temperatures are merely representative. Different temperatures may be employed particularly where the liquid heating arrangement of my invention is employed in other than a coffee maker.

Referring to FIGS. 5 and 6, two electrical circuit diagram embodiments are shown. In FIG. 5, the standby thermostat 57 is connected in parallel with the switch 60, and the operating thermostat 55. The switch 60 is opened to place the arrangement in standby, de-energizing the operating thermostat 55 and the solenoid valve 26 to shut the valve, the heater 52 being thereby controlled by the standby thermostat 57. When it is desired to dispense liquid from the vessel, the switch 60 is closed, as shown in the dotted line position in FIG. 5, causing current to flow to the solenoid valve 26 opening the valve, and to the operating thermostat 55. Since the operating thermostat 55 is set at a higher temperature than the standby thermostat 57, it will take over control of the heater 52 from the standby thermostat. In FIG. 6 the second electrical circuit embodiment is shown which includes switch 62 having an operating position, as shown by the dotted line, and a standby position, as shown by the solid line. When the switch 62 is in the standby position, the solenoid valve 26 and the operating thermostat 55 are de-energized and a circuit is completed through the standby thermostat 57 and the heater 52. When the switch 62 is in the operating position, the standby thermostat 57 is de-energized and the circuit is completed through the solenoid valve 26 to open the valve and through the operating thermostat 55 to the heater 52. The switch knob 34 is employed to control the position of switches 60 and 62 and, in turn, the brewing of the coffee.

If desired, the circuits shown in FIGS. 5 and 6 may be modified such that a high voltage is applied to the heater 52 whereas a lower voltage is employed to operate the remainder of the circuit. By way of example, FIG. 7 of the drawings is a modified version of the circuit shown in FIG. 5, the heater 52 being connected through relay contacts 76 across the two "hot" conductors 70 and 71 of a conventional 240 volt household supply. The third or "common" conductor 66 is connected to a terminal of the solenoid valve 26 and to one terminal of a relay solenoid 74. Relay solenoid 74 controls the contacts 76, closing those contacts whenever the solenoid 74 is energized.

FIG. 8 illustrates a similar modification of the circuit shown in FIG. 6. As in FIG. 7, the heater element 52 is connected across the two "hot" conductors 70 and 71 whenever relay solenoid 74 is energized.

The operation of the circuits shown in FIGS. 7 and 8 is substantially identical to the operation of the circuits shown in FIGS. 5 and 6, respectively, except that in each case, the thermostats 55 and 57 energize the solenoid 74 which, in turn, closes the contacts 76 to energize the heater 52, rather than energizing the heater 52 directly.

Although the liquid heating method and apparatus of our invention have been described in the context of use in a coffee maker, it will be evident that our invention may be employed in other liquid heaters where it is necessary to avoid overflow drip caused by liquid expansion. It should also be understood that the embodiments of the invention which have been described are merely illustrative of an application of the principles of the invention. Numerous modifications may be made by those skilled in the art without departing from the true spirit and scope of the invention.

We claim:
1. A method of preventing overflow due to volume expansion in a liquid heating vessel, comprising the steps of: maintaining the liquid in said vessel at a predetermined standby threshold temperature,
commencing circulation of the liquid through said vessel,
heating the liquid in said vessel to an operating temperature in excess of said standby temperature while circulating the liquid through said vessel,
stopping the circulation of liquid through said vessel, and
commencing reduction of the volume of liquid in said vessel by reducing the temperature of the liquid in the vessel from said operating temperature toward said standby threshold temperature.

2. The method of claim 1 wherein the circulation of the liquid and the heating of the liquid to said operating temperature are commenced simultaneously.

3. The method of claim 1 wherein the stoppage of the circulation of liquid and the commencing of the reduction of liquid volume occur simultaneously.

References Cited

UNITED STATES PATENTS

| | | | |
|---|---|---|---|
| 2,539,800 | 1/1951 | Tama | 13—29 |
| 3,087,438 | 4/1963 | Ciesielski | 103—255 |
| 3,178,557 | 4/1965 | Umann | 222—146 X |
| 3,220,334 | 11/1965 | Martin | 222—146 X |

JOSEPH V. TRUHE, Primary Examiner

C. L. ALBRITTON, Assistant Examiner

U.S. Cl. X.R.

219—297, 328; 99—281